US009519440B2

United States Patent
Shacham et al.

(10) Patent No.: US 9,519,440 B2
(45) Date of Patent: Dec. 13, 2016

(54) PROVIDING COMMAND QUEUING IN EMBEDDED MEMORIES

(71) Applicant: QUALCOMM Incorporated, San Diego, CA (US)

(72) Inventors: Assaf Shacham, Zichron Yaakov (IL); Tom Yahalom, Kibbutz Maagan-Michael (IL); Aviad Zacks-Shtrauss, Ramat-Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/478,032

(22) Filed: Sep. 5, 2014

(65) Prior Publication Data

US 2015/0074294 A1    Mar. 12, 2015

Related U.S. Application Data

(60) Provisional application No. 61/875,721, filed on Sep. 10, 2013.

(51) Int. Cl.
| | |
|---|---|
| *G06F 3/00* | (2006.01) |
| *G06F 3/06* | (2006.01) |
| *G06F 13/42* | (2006.01) |

(52) U.S. Cl.
CPC ............ *G06F 3/0659* (2013.01); *G06F 3/061* (2013.01); *G06F 3/0679* (2013.01); *G06F 13/4243* (2013.01); *G06F 2003/0697* (2013.01); *G06F 2206/1014* (2013.01)

(58) Field of Classification Search
CPC ...... G06F 3/0659; G06F 3/061; G06F 3/0679; G06F 2003/0697

USPC .................................................. 710/5
See application file for complete search history.

(56) References Cited

U.S. PATENT DOCUMENTS

| | | | |
|---|---|---|---|
| 2009/0094678 A1 | 4/2009 | Floman et al. | |
| 2011/0055457 A1 | 3/2011 | Yeh | |
| 2011/0099313 A1 | 4/2011 | Bolanowski | |
| 2013/0073795 A1 | 3/2013 | Hasegawa | |

OTHER PUBLICATIONS

Author Unknown, "Embedded Multi-Media Card (eMMC) Electrical Standard (5.01)," Standard JESD84-B50.1, Jul. 2014, JEDEC Solid State Technology Association, 302 pages.
International Search Report and Written Opinion for PCT/US2014/054527 mailed Dec. 15, 2014, 10 pages.
International Preliminary Report on Patentability for PCT/US2014/054527, mailed Aug. 28, 2015, 14 pages.

*Primary Examiner* — Ernest Unelus
(74) *Attorney, Agent, or Firm* — Withrow & Terranova, PLLC

(57) ABSTRACT

Providing command queuing in embedded memories is provided. In particular, aspects disclosed herein relate to a process through which a status of the queue is communicated to a host from a device. Aspects of the present disclosure use the command structure of the embedded Multi-Media Card (eMMC) standard, such that the host may determine a state of the queue in the device proximate a known end of an in-progress data transfer. In this manner, the host can select a task to commence after completion of a current data transfer while the current data transfer is still ongoing.

23 Claims, 4 Drawing Sheets

PROVIDING COMMAND QUEUING IN EMBEDDED MEMORIES

PRIORITY CLAIM

The present application claims priority to U.S. Provisional Patent Application Ser. No. 61/875,721 filed on Sep. 10, 2013, and entitled "SYSTEMS AND METHODS FOR PROVIDING COMMAND QUEUING IN THE EMBEDDED MULTI-MEDIA CONTROLLER (eMMC) STANDARD," which is incorporated herein by reference in its entirety.

BACKGROUND

I. Field of the Disclosure

The technology of the disclosure relates generally to the embedded memory and particularly to providing command queuing therefore.

II. Background

Many mobile devices rely on flash memory to store data and/or software for use by the mobile device. Flash memory comes in two general flavors: fixed (embedded) and removable. Removable flash memory typically takes the form of a removable memory card and is commonly used in devices such as digital cameras or audio devices. Embedded flash memory is generally soldered or otherwise permanently affixed to the circuit board or other support medium within a mobile device.

The Joint Electron Device Engineering Council (JEDEC) is responsible for producing the embedded Multi-Media Card (eMMC) standards relating to one type of embedded flash memory. eMMC describes an architecture consisting of an embedded storage solution with Multi-Media Card interface, flash memory and controller, all in a small ball grid array (BGA) package. eMMC is currently a synchronous protocol where the host sends a command to read from the device or to write to the device. The device sends a response, and then a data block transfer occurs. At the completion of the data transfer, the host sends another command, receives another response, and another data transfer occurs. This synchronous command structure occurs for every data transfer into and out of the eMMC memory. Normally, software is involved with every command and response. Such software is typically a slow reacting entity, and software involvement in every command and response adds to the delay in effectuating the data transfers.

In contrast to the synchronous command structure of eMMC, another memory standard, the universal flash storage (UFS), adopts the well-known small computer system interface (SCSI) Architecture Model and command protocols supporting multiple commands with command queuing features and enabling a multi-thread programming paradigm. In practice, command queuing allows the host to send a plurality of tasks to the device in advance of execution of those tasks by the device. These tasks are stored in a queue in the device. The device then picks a task from the plurality of tasks it has received, executes the picked task, and informs the host of completion.

Command queuing allows for more efficient use of the bus on which the data transfer occurs because the software at the host and the device can work simultaneously rather than have to wait on one another. eMMC would benefit from command queuing and the improvement in efficiencies in use of the data bus. However, given that eMMC historically has not contemplated command queuing, there is a need to define how the host may learn of the status of the tasks in the queue at the device.

SUMMARY OF THE DISCLOSURE

Aspects disclosed in the detailed description include providing command queuing in embedded memories. In particular, aspects disclosed herein relate to a process through which the status of the queue is communicated to the host from the device. Aspects of the present disclosure use the command structure of the embedded Multi-Media Card (eMMC) standard, such that the host may determine the state of the queue in the device proximate a known end of an in-progress data transfer. In this manner, the host can select a task to commence after completion of the current data transfer while the current data transfer is still ongoing.

In this regard in one aspect, a host is disclosed. The host comprises a transceiver configured to transmit signals to and receive signals from a device compliant with an eMMC standard. The host also comprises a control system operably coupled to the transceiver. The control system is configured to issue a command to the device to determine a state of a queue status register (QSR) in the device. The control system is also configured to receive a response from the device with information about the QSR of the device.

In another aspect, a device is disclosed. The device comprises a transceiver configured to transmit signals to and receive signals from a host compliant with an eMMC standard. The device also comprises a control system operably coupled to the transceiver. The control system is configured to receive a command from the host to determine a state of a QSR in the device. The control system is further configured to transmit a response to the host with information about the QSR of the device.

In another aspect, a method of operating an eMMC host is disclosed. The method comprises transmitting signals from the eMMC host to a device including a command to determine a state of a QSR in the device. The method also comprises receiving a response from the device with information about the QSR of the device.

DETAILED DESCRIPTION

Figure 1:
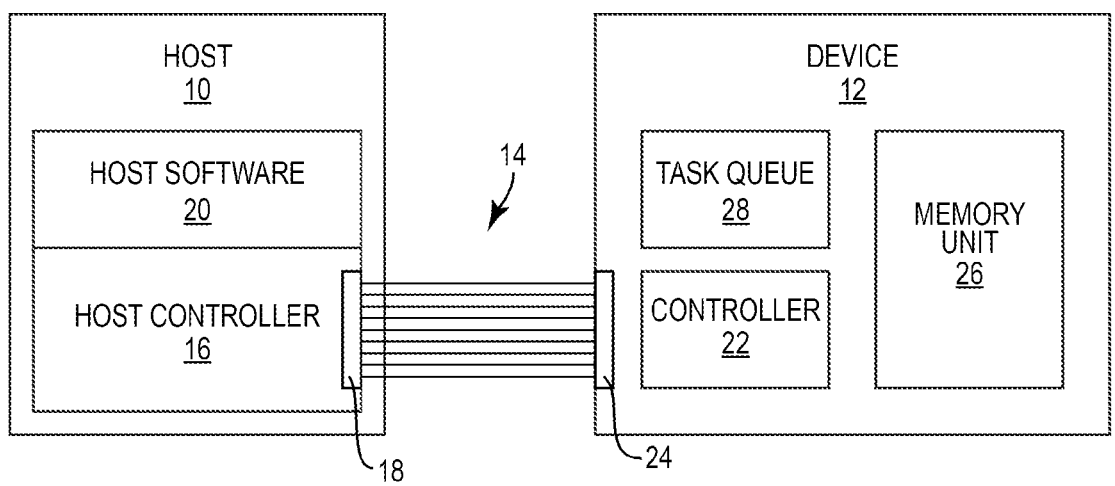
FIG. 1 is a block diagram of an exemplary connection between a host and a device using an embedded Multi-Media Card (eMMC) standard.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing command queuing in embedded memories. In particular, aspects disclosed herein relate to a process through which the status of the queue is communicated to the host from the device. Aspects of the present disclosure use the command structure of the embedded Multi-Media Card (eMMC) standard, such that the host may determine the state of the queue in the device proximate a known end of an in-progress data transfer. In this manner, the host can select a task to commence after completion of the current data transfer while the current data transfer is still ongoing.

When the host creates a task, the host a priori knows how much data is going to be transferred. Given that the host also instructs the device when to begin the data transfer, the host may determine when a data transfer associated with a particular task is about to end. Accordingly, the host may schedule a polling inquiry at some point prior to the completion of the data transfer. In an exemplary aspect, the polling inquiry is in the form of a SEND_QUEUE_STATUS command (CMD13) signal from the host to the device. The device responds with queue status information. The host then has enough information as to which tasks are ready for execution in the queue. At the end of the current data transfer, the host may issue a command to execute a new task. This arrangement avoids a need for an additional pin. Avoiding extra pins saves space and cost. Likewise, this arrangement reduces the number of polling inquiries by tying the polling event to the proximate end of the data transfer rather than rely on a periodic polling. That is, if polling is done periodically, the host may poll twice (or more) during a single data transfer. In contrast, the present disclosure has only a single polling event during a single data transfer (proximate the end of the data transfer). Elimination of the extra polling provides more efficient use of the data bus.

The addition of command queuing in an eMMC system allows the device to optimize the order of execution. Such optimization may extend battery life and/or eliminate delay in the execution of tasks. Command queuing facilitates the device notifying the host of the current queue status and improves error handling. Additionally, command queuing improves the timing aspects for the commands.

In this regard, FIG. 1 is block diagram of a host 10 coupled to a device 12 via conductors 14. The communications between host 10 and device 12 conform to the eMMC standard such as eMMC electrical standard 5.0 published by the Joint Electron Device Engineering Council (JEDEC) in June 2012. Revision 5.01 was published in July 2014. Work is currently being done to complete revision 5.1, with a target publication of December 2014. Copies of this standard are available from JEDEC at 3103 North 10th Street, Suite 240 South, Arlington Va. 22201-2107. The host 10 includes a host controller 16 that is a hardware based system with appropriate communication interface 18. Host controller 16 interoperates with host software 20. Collectively, the host controller 16 and host software 20 are a control system.

With continued reference to FIG. 1, the device 12 includes a controller 22 that is a hardware based system with appropriate communication interface 24. The device 12 further includes a memory unit 26 (e.g., a negated AND or NOT AND (NAND) Flash storage device). The device 12 further includes a task queue 28. Collectively, the controller 22 and any software and firmware associated with the operation of the controller 22 are a control system.

There was a joint proposal by Samsung, SanDisk, and Qualcomm before JEDEC to include command queuing through a QRDY pin. The use of such a QRDY pin may allow command queuing, but may increase costs and/or impose a space penalty. Nevertheless, to help contrast aspects of the present disclosure, aspects of a QRDY pin are set forth in FIG. 2. In particular FIG. 2 provides a signal progression against time flow 30 for a QRDY pin.

Figure 2:
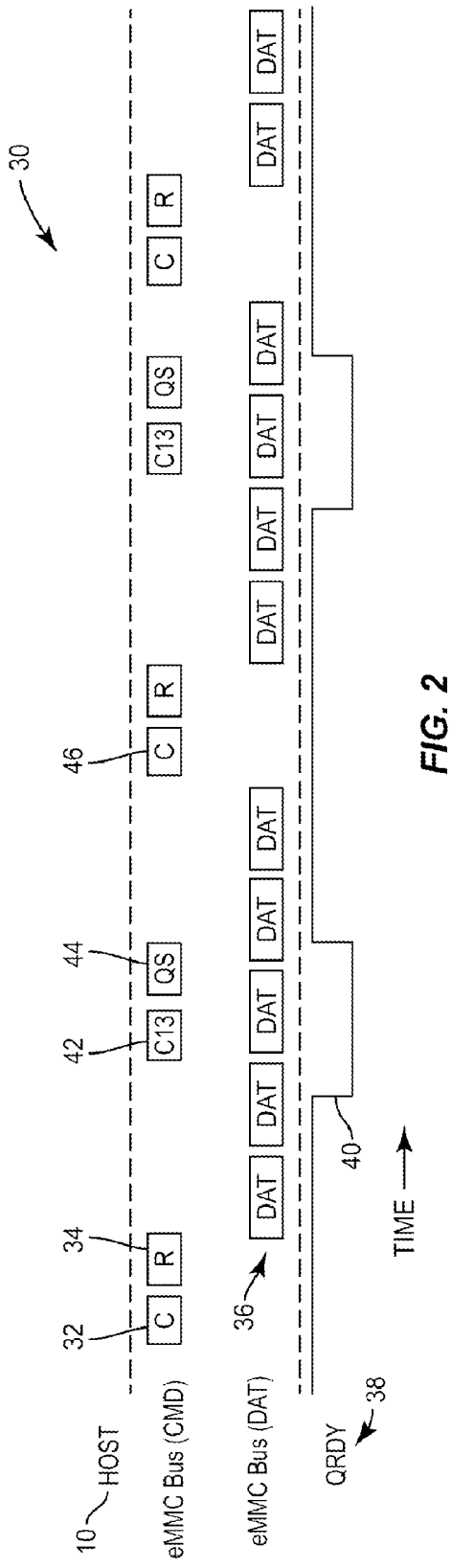
FIG. 2 is a timing diagram of signals between a host and a device using an interrupt pin.

In this regard, FIG. 2 illustrates the timing diagram. In particular, the host 10 sends a command 32 (C) and receives a response (R) 34. The command 32 instructs the device 12 to begin execution of a task in the queue at the device 12. After the response 34, data flow 36 begins. While data flow 36 is in progress, the device 12 finishes readying a task in the task queue 28 for execution. The QRDY pin 38 is transitioned from a high to a low (see transition 40). The change in the level of the QRDY pin 38 causes the host 10 to send a command 42 to the device 12. In an exemplary aspect, the command 42 is a CMD13. The device 12 sends back a response 44, which may include the queue state (QS) including the newly readied task. At the end of the data flow 36, the host sends a new command 46 instructing the device 12 to begin execution of one of the readied tasks in the task queue 28. The use of the QRDY pin 38 allows the host 10 to know when tasks are ready for execution. The host 10 can issue the appropriate execution commands at the end of an existing data flow rather than having to wait for the end of a data flow, query the state of the queue at the end of the data flow and then issue a task execution command after the query.

While the addition of the QRDY pin 38 facilitates the command queuing and its commensurate time savings and efficient use of the data bus, the addition of a pin adds to the expense of fabrication and imposes a design penalty as an additional conductor must be routed to the new pin. Further, the addition of a pin adds to the footprint of the device and the host with the pin relative to a similar device (and host) without the additional pin. Thus, the addition of QRDY pin 38 is generally undesirable.

Aspects of the present disclosure avoid use of the QRDY pin 38 by utilizing knowledge that the host 10 has regarding the currently active data transfer coupled with a CMD13 to secure a timely update as to the status of the queue at the device 12. Additional registers may be added in the vendor-specific range of the host controller interface (HCI) register map to help facilitate the processes of the present disclosure. Before addressing the added registers, an overview of the process is provided.

Figure 3:
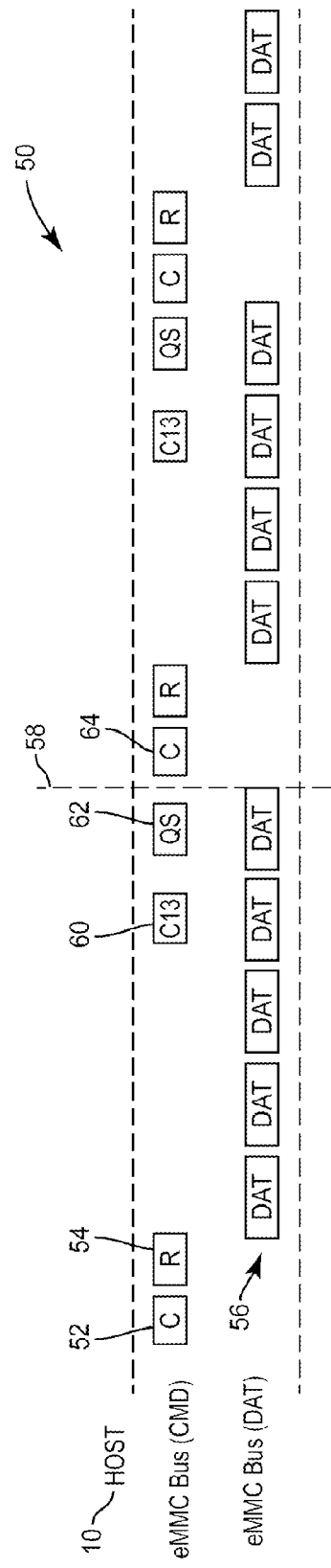
FIG. 3 is a timing diagram of signals between a host and a device using a command structure according to exemplary aspects of the present disclosure.

In this regard, FIG. 3 illustrates a signal progression against time flow 50. The signals start with the host 10 sending a command 52 to the device 12 and receiving a response 54. The command 52 instructs the device 12 to execute a ready task. The device 12 executes the ready task and the data transfer 56 begins. The host 10 knows a priori how much data will be transferred as part of the data transfer 56, and thus knows (or can calculate) when the end 58 of the data transfer 56 will occur. Thus, given that the control system of the host 10 can know when the end 58 of the data transfer 56 will occur, the control system of the host 10 can select a time prior to, but proximate the end 58. The control system of the host 10 sends a CMD13 60 to the device 12 at this selected time. The CMD13 60 includes an inquiry as to the state of the task queue 28. The device 12 responds with a QS signal 62 that has information about the state of the task queue 28, including information about all tasks that are ready for execution. Based on the ready tasks, the host 10 then issues a command 64 to execute a task, and the process repeats.

Figure 4:
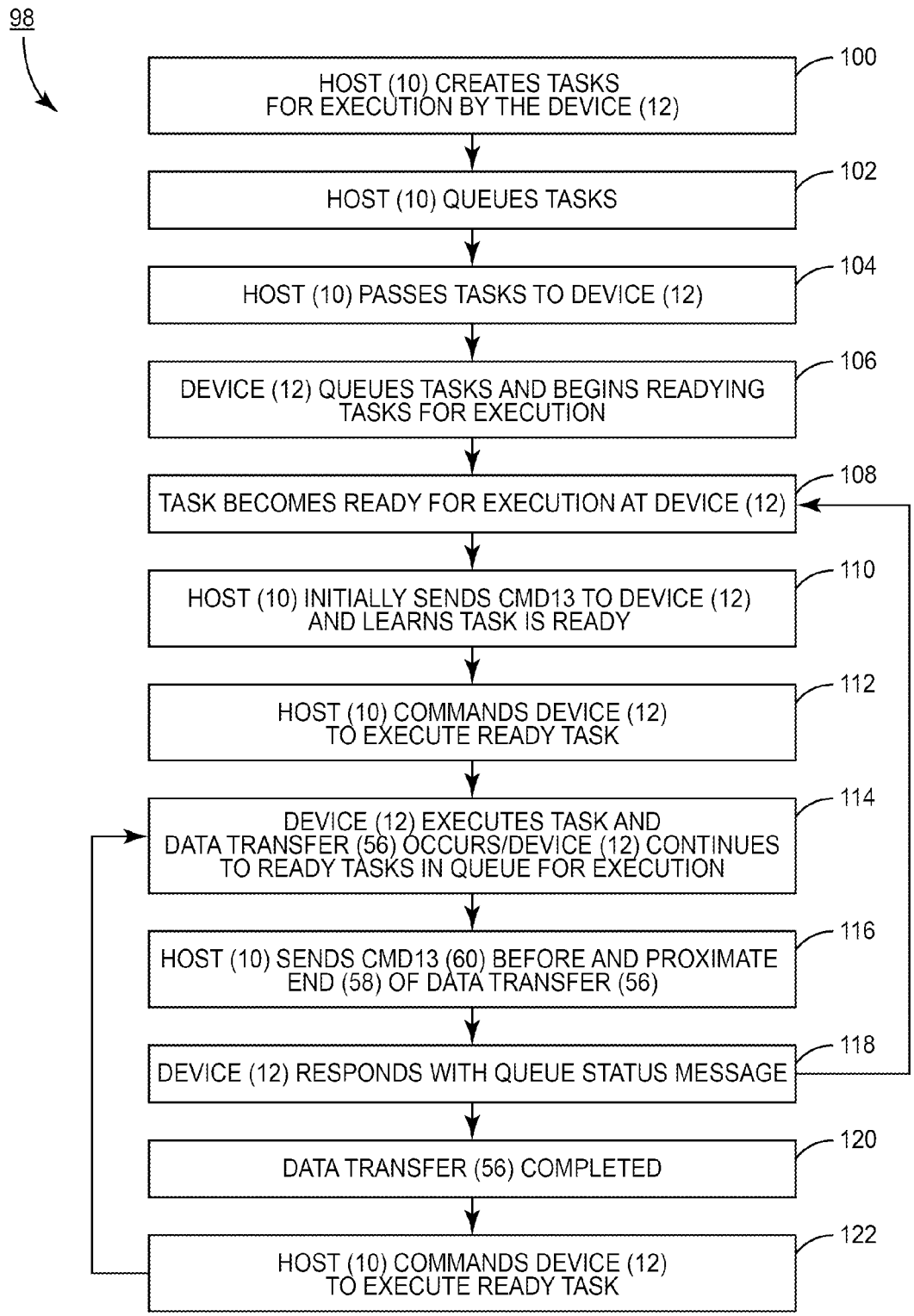
FIG. 4 is a flow chart of an exemplary process of the present disclosure.

A more robust flow chart of a process 98 behind the signal progression against time flow 50 is presented with reference to FIG. 4. The process 98 begins with the host 10 creating one or more tasks for execution by the device 12 (block 100). The host 10 queues the tasks (block 102) and passes the one or more tasks to the device 12 (block 104) with a command to queue the task(s). The device 12 queues the tasks and begins readying the tasks for execution (block 106). At some point, the device 12 finishes readying one or more tasks for execution (block 108) and the device 12 updates the task queue 28.

Initially, the host 10 sends a CMD13 to the device 12 and learns that a task is ready (block 110). The host 10 commands the device 12 to execute the ready task (block 112). The device 12 executes the task and data transfer 56 occurs. Meanwhile, the device 12 continues to ready tasks in the queue for execution (block 114). One or more additional tasks may be readied in this fashion.

The host 10, based on its a priori knowledge of when the end 58 of the data transfer 56 will occur, sends a CMD13 60 before but proximate the end 58 of the data transfer 56 (block 116). The device 12 responds with a queue status message (block 118) including any tasks that have become ready for execution since the last update provided to the host 10. If there is no task ready for execution at block 118, the system returns to block 108 and executes periodic polling until a task becomes ready. If however, there is a task ready for execution, the data transfer 56 completes (block 120) and the host 10 sends a command (CMD46 or CMD47) 64 to device 12 to execute a ready task (block 122). The process 98 then repeats as noted with the device 12 executing the task.

As noted above, a number of registers may be included as Command Queueing HCI. These registers are summarized in Table 1 below:

While these are described in detail in the parent provisional application, of particular interest is the Send Status Command Idle Timer field of the Send Status Configuration 1 Register, which allows the host controller 16 to know the time period for which to poll the device 12 using the STATUS command to verify the command queue status. Periodic polling is used when tasks are pending in the device 12, but no data transfer takes place. Additionally note that different implementations may refer to different registers by different names (e.g., "Command Queueing Send Status Configuration 1") without departing from the scope of the present disclosure.

Also of particular interest is the Send Status Command Block Counter field of the Send Status Configuration 1 Register, which indicates to the host controller 16 in which block to send STATUS command to verify the command queue status. The host 10 will send status command BLOCK_CNT-1 blocks before the end of the transfer.

While not shown, the control system may issue a queue management request, which may include a command to discard a task.

The systems and methods for providing command queueing in the eMMC standard according to aspects disclosed herein may be provided in or integrated into any processor-based device. Examples, without limitation, include: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 5:
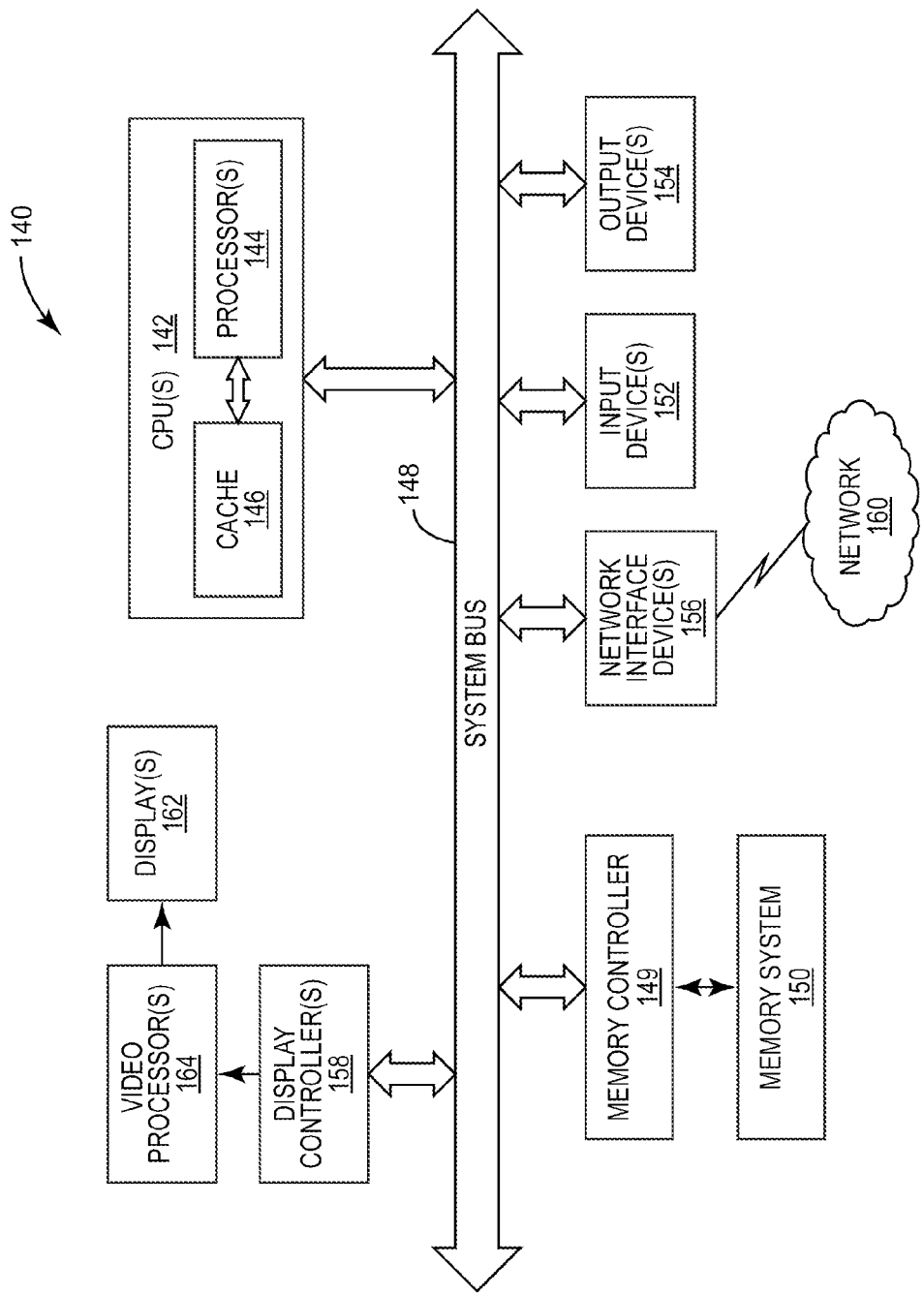
FIG. 5 is a block diagram of an exemplary processor-based system that can include the host and device of FIG. 1 operating according to aspects of the present disclosure.

In this regard, FIG. 5 illustrates an example of a processor-based system 140 that can employ the host 10 and device 12 illustrated in FIG. 1. In this example, the processor-based system 140 includes one or more central processing units (CPUs) 142, each including one or more processors 144. The CPU(s) 142 may be a master device and run the software 20. The CPU(s) 142 may have cache memory 146 coupled to the processor(s) 144 for rapid access to temporarily stored data. The CPU(s) 142 is coupled to a system bus 148 and can

TABLE 1

List of Registers

| | Offset from CQBASE | Symbol | Register Name |
| --- | --- | --- | --- |
| CFG & CAP | 00h | CQVER | Command Queueing Version |
| | 04h | CQCAP | Command Queueing Capabilities (reserved) |
| | 08h | CQCFG | Command Queueing Configuration |
| | 0Ch | CQCTL | Command Queueing Control |
| Interrupt | 10h | CQIS | Command Queueing Interrupt Status |
| Control | 14h | CQISTE | Command Queueing Interrupt Status Enable |
| | 18h | CQISGE | Command Queueing Interrupt Signal Enable |
| | 1Ch | CQIC | Command Queueing Interrupt Coalescing |
| Task Submission | 20h | CQTDLBA | Command Queueing Task Descriptor List Base Address |
| | 24h | CQTDLBAU | Command Queueing Task Descriptor List Base Address Upper 32 bits |
| | 28h | CQTDBR | Command Queueing Task Doorbell |
| | 2Ch | CQTCN | Command Queueing Task Completion Notification |
| Task | 30h | CQDQS | Command Queueing Device Queue Status |
| Management | 34h | CQDPT | Command Queueing Device Pending Tasks |
| | 38h | CQTCLR | Command Queueing Task Clear |
| SQS and DCMD | 40h | CQSSC1 | Command Queueing Send Status Configuration 1 |
| | 44h | CQSSC2 | Command Queueing Send Status Configuration 2 |
| | 48h | CQCRDCT | Command Queueing Command Response for Direct-Command Task |
| Error handling | 50h | CQRMEM | Command Queueing Response Mode Error Mask |
| | 54h | CQTERRI | Command Queueing Task Error Information |
| | 58h | CQCRI | Command Queueing Command Response Index |
| | 5Ch | CQCRA | Command Queueing Command Response Argument | intercouple devices included in the processor-based system 140. As is well known, the CPU(s) 142 communicates with these other devices by exchanging address, control, and data information over the system bus 148. For example, the CPU(s) 142 can communicate bus transaction requests to the memory system 150 that may be the device 12. Transaction requests may go through a memory controller 149, which may be a host controller 16. Although not illustrated in FIG. 5, multiple system buses 148 could be provided, wherein each system bus 148 constitutes a different fabric.

Other devices can be connected to the system bus 148. As illustrated in FIG. 5, these devices can include the memory system 150, one or more input devices 152, one or more output devices 154, one or more network interface devices 156, and one or more display controllers 158, as examples. The input device(s) 152 can include any type of input device, including but not limited to input keys, switches, voice processors, etc. The output device(s) 154 can include any type of output device, including but not limited to, audio, video, other visual indicators, etc. The network interface device(s) 156 can be any devices configured to allow exchange of data to and from a network 160. The network 160 can be any type of network, including but not limited to, a wired or wireless network, private or public network, a local area network (LAN), a wide LAN, wireless LAN, and the Internet. The network interface device(s) 156 can be configured to support any type of communication protocol desired.

The CPU(s) 142 may also be configured to access the display controller(s) 158 over the system bus 148 to control information sent to one or more displays 162. The display controller(s) 158 sends information to the display(s) 162 to be displayed via one or more video processors 164, which process the information to be displayed into a format suitable for the display(s) 162. The display(s) 162 can include any type of display, including but not limited to, a cathode ray tube (CRT), light emitting diode display (LED), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The hosts and devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A host comprising:
   a transceiver configured to transmit signals to and receive signals from a device compliant with an embedded Multi-Media Card (eMMC) standard; and
   a control system operably coupled to the transceiver and configured to:
   issue a command to the device to determine a state of a queue status register (QSR) in the device;
   determine an upcoming end to a current data transfer from the device; and receive a response from the device with information about the QSR of the device before the upcoming end.

2. The host of claim 1, wherein the control system is further configured to issue the command proximate in time to and before the upcoming end.

3. The host of claim 1, wherein the control system is further configured to issue a command to queue a task.

4. The host of claim 1, wherein the control system is further configured to issue a queue management request.

5. The host of claim 4, wherein the queue management request is a command to discard a task.

6. The host of claim 1, wherein the control system is further configured to issue an execute read task command.

7. The host of claim 1, wherein the control system is further configured to issue an execute write task command.

8. The host of claim 1 integrated into a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

9. A device comprising:
a transceiver configured to transmit signals to and receive signals from a host compliant with an embedded Multi-Media Card (eMMC) standard; and
a control system operably coupled to the transceiver and configured to:
receive a command from the host to determine a state of a queue status register (QSR) in the device; and
transmit a response to the host with information about the QSR of the device before an upcoming end to a current data transfer from the device.

10. The device of claim 9, wherein the control system is further configured to determine the state of the QSR in the device before transmitting the response.

11. The device of claim 9, wherein the control system is further configured to receive a command to queue a task.

12. The device of claim 9, wherein the control system is further configured to receive a queue management request.

13. The device of claim 12, wherein the queue management request is a command to discard a task.

14. The device of claim 9, wherein the control system is further configured to receive an execute read task command.

15. The device of claim 9, wherein the control system is further configured to receive an execute write task command.

16. A method of operating an embedded Multi-Media Card (eMMC) host, comprising:
transmitting signals from an eMMC host to a device including a command to determine a state of a queue status register (QSR) in the device;
determining an upcoming end to a current data transfer from the device; and
receiving a response from the device with information about the QSR of the device before the upcoming end.

17. The method of claim 16, further comprising issuing the command proximate in time to and before the upcoming end.

18. The method of claim 17, further comprising receiving the response before the upcoming end.

19. The method of claim 16, further comprising issuing a command to queue a task.

20. The method of claim 16, further comprising issuing a queue management request.

21. The method of claim 20, wherein issuing the queue management request comprises commanding the device to discard a task.

22. The method of claim 16, further comprising issuing an execute read task command.

23. The method of claim 16, further comprising issuing an execute write task command.

* * * * *